(12) United States Patent
Hall et al.

(10) Patent No.: US 7,665,552 B2
(45) Date of Patent: Feb. 23, 2010

(54) SUPERHARD INSERT WITH AN INTERFACE

(76) Inventors: David R. Hall, 2185 S. Larsen Pkwy., Provo, UT (US) 84606; Ronald Crockett, 2185 S. Larsen Pkwy., Provo, UT (US) 84606

(*) Notice: Subject to any disclaimer, the term of this patent is extended or adjusted under 35 U.S.C. 154(b) by 462 days.

(21) Appl. No.: 11/553,338

(22) Filed: Oct. 26, 2006

(65) Prior Publication Data
US 2008/0099250 A1 May 1, 2008

(51) Int. Cl.
*E21B 10/46* (2006.01)
(52) U.S. Cl. .................. 175/426; 175/420.2
(58) Field of Classification Search .......... 175/374, 175/420.2, 426, 428, 434
See application file for complete search history.

(56) References Cited

U.S. PATENT DOCUMENTS

| | | |
|---|---|---|
| 2,004,315 A | 6/1935 | Fean |
| 3,746,396 A | 7/1973 | Radd |
| 3,807,804 A | 4/1974 | Kniff |
| 3,932,952 A | 1/1976 | Helton |
| 3,945,681 A | 3/1976 | White |
| 4,005,914 A | 2/1977 | Newman |
| 4,006,936 A | 2/1977 | Crabiel |
| 4,109,737 A | 8/1978 | Bovenkerk |
| 4,201,421 A | 5/1980 | Den Besten |
| 4,277,106 A | 7/1981 | Sahley |
| 4,333,902 A | 6/1982 | Hara |
| 4,333,986 A | 6/1982 | Tsuji et al. |
| 4,412,980 A | 11/1983 | Tsuji |
| 4,425,315 A | 1/1984 | Tsuji |
| 4,484,644 A | 11/1984 | Cook |
| 4,489,986 A | 12/1984 | Dziak |
| 4,678,237 A | 7/1987 | Collin |
| 4,682,987 A | 7/1987 | Brady |
| 4,688,856 A | 8/1987 | Elfgen |
| 4,725,098 A | 2/1988 | Beach |
| 4,729,603 A | 3/1988 | Elfgen |
| 4,765,686 A | 8/1988 | Adams |
| 4,765,687 A | 8/1988 | Parrott |
| 4,944,559 A | 7/1990 | Sionnet |
| 5,011,515 A | 4/1991 | Frushour |
| 5,154,245 A | 10/1992 | Waldenstrom |
| 5,251,964 A | 10/1993 | Ojanen |
| 5,332,348 A | 7/1994 | Lemelson |
| 5,417,475 A | 5/1995 | Graham |
| 5,447,208 A | 9/1995 | Lund |
| 5,535,839 A | 7/1996 | Brady |
| 5,542,993 A | 8/1996 | Rabinkin |
| 5,653,300 A | 8/1997 | Lund |
| 5,823,632 A | 10/1998 | Burkett |
| 5,845,547 A | 12/1998 | Sollami |
| 5,848,657 A | 12/1998 | Flood |

(Continued)

Primary Examiner—Daniel P Stephenson
(74) Attorney, Agent, or Firm—Tyson J. Wilde

(57) ABSTRACT

In one aspect of the invention, a superhard insert has a carbide substrate bonded to ceramic layer at an interface. The substrate has a generally frusto-conical end at the interface with a tapered portion leading to a flat portion. The central section of the ceramic layer may have a first thickness immediately over the flat portion of the substrate. The peripheral section of the ceramic layer has a second thickness being less than the first thickness covering the tapered portion of the substrate. The ceramic layer may be formed using HPHT technology.

11 Claims, 10 Drawing Sheets

U.S. PATENT DOCUMENTS

| | | |
|---|---|---|
| 5,875,862 A | 3/1999 | Jurewicz |
| 5,967,250 A | 10/1999 | Lund |
| 5,992,405 A | 11/1999 | Sollami |
| 6,006,846 A | 12/1999 | Tibbitts |
| 6,019,434 A | 2/2000 | Emmerich |
| 6,044,920 A | 4/2000 | Massa |
| 6,056,911 A | 5/2000 | Griffin |
| 6,098,730 A * | 8/2000 | Scott et al. .................. 175/432 |
| 6,113,195 A | 9/2000 | Mercier |
| 6,170,917 B1 | 1/2001 | Heinrich |
| 6,196,636 B1 | 3/2001 | Mills |
| 6,196,910 B1 | 3/2001 | Johnson |
| 6,216,805 B1 | 4/2001 | Lays |
| 6,270,165 B1 | 8/2001 | Peay |
| 6,341,823 B1 | 1/2002 | Sollami |
| 6,354,771 B1 | 3/2002 | Bauschulte |
| 6,364,420 B1 | 4/2002 | Sollami |
| 6,371,567 B1 | 4/2002 | Sollami |
| 6,375,272 B1 | 4/2002 | Ojanen |
| 6,419,278 B1 | 7/2002 | Cunningham |
| 6,478,383 B1 | 11/2002 | Ojanen |
| 6,484,826 B1 * | 11/2002 | Anderson et al. ........... 175/428 |
| 6,499,547 B2 | 12/2002 | Scott |
| 6,508,318 B1 | 1/2003 | Linden |
| 6,517,902 B2 | 2/2003 | Drake |
| 6,585,326 B2 | 7/2003 | Sollami |
| 6,596,225 B1 | 7/2003 | Pope |
| 6,685,273 B1 | 2/2004 | Sollami |
| 6,709,065 B2 | 3/2004 | Peay |
| 6,719,074 B2 | 4/2004 | Tsuda et al. |
| 6,733,087 B2 | 5/2004 | Hall |
| 6,739,327 B2 | 5/2004 | Sollami |
| 6,758,530 B2 | 7/2004 | Sollami |
| 6,824,225 B2 | 11/2004 | Stiffler |
| 6,889,890 B2 | 5/2005 | Yamazak |
| 6,933,049 B2 * | 8/2005 | Wan et al. .................. 428/408 |
| 6,966,611 B1 | 11/2005 | Sollami |
| 6,994,404 B1 | 2/2006 | Sollami |
| 7,204,560 B2 | 4/2007 | Mercier |
| 2001/0004946 A1 | 6/2001 | Jensen |
| 2003/0209366 A1 | 11/2003 | McAlvain |
| 2004/0026983 A1 | 2/2004 | McAlvain |
| 2004/0065484 A1 | 4/2004 | McAlvain |
| 2005/0044800 A1 | 3/2005 | Hall et al. |
| 2006/0237236 A1 | 10/2006 | Sreshta |

* cited by examiner

SUPERHARD INSERT WITH AN INTERFACE

BACKGROUND OF THE INVENTION

The invention relates to an improved cutting element or insert that may be used in machinery such as crushers, picks, grinding mills, roller cone bits, rotary fixed cutter bits, earth boring bits, percussion bits or impact bits, and drag bits. More particularly, the invention relates to inserts comprised of a carbide substrate with a nonplanar interface and an abrasion resistant layer of super hard material affixed thereto using a high pressure high temperature press apparatus. Such inserts typically comprise a super hard material layer or layers formed under high temperature and pressure conditions, usually in a press apparatus designed to create such conditions, cemented to a carbide substrate containing a metal binder or catalyst such as cobalt. The substrate is often softer than the super hard material to which it is bound. Some examples of super hard materials that high temperature high pressure (HPHT) presses may produce and sinter include cemented ceramics, diamond, polycrystalline diamond, and cubic boron nitride. A cutting element or insert is normally fabricated by placing a cemented carbide substrate into a container or cartridge with a layer of diamond crystals or grains loaded into the cartridge adjacent one face of the substrate. A number of such cartridges are typically loaded into a reaction cell and placed in the high pressure high temperature press apparatus. The substrates and adjacent diamond crystal layers are then compressed under HPHT conditions which promotes a sintering of the diamond grains to form the polycrystalline diamond structure. As a result, the diamond grains become mutually bonded to form a diamond layer over the substrate face, which is also bonded to the substrate face.

Such inserts are often subjected to intense forces, torques, vibration, high temperatures and temperature differentials during operation. As a result, stresses within the structure may begin to form. Drill bits for example may exhibit stresses aggravated by drilling anomalies during well boring operations such as bit whirl or spalling often resulting in delamination or fracture of the abrasive layer or substrate thereby reducing or eliminating the cutting elements efficacy and decreasing overall drill bit wear life. The ceramic layer of an insert sometimes delaminates from the carbide substrate after the sintering process and/or during percussive and abrasive use. Damage typically found in percussive and drag bits is a result of shear failures, although non-shear modes of failure are not uncommon. The interface between the ceramic layer and substrate is particularly susceptible to nonshear failure modes.

U.S. Pat. No. 5,544,713 by Dennis, which is herein incorporated by reference for all that it contains, discloses a cutting element which has a metal carbide stud having a conic tip formed with a reduced diameter hemispherical outer tip end portion of said metal carbide stud.

U.S. Pat. No. 6,196,340 by Jensen, which is herein incorporated by reference for all that it contains, discloses a cutting element insert provided for use with drills used in the drilling and boring through of subterranean formations.

U.S. Pat. No. 6,258,139 by Jensen, which is herein incorporated by reference for all that it contains, discloses a cutting element, insert or compact which is provided for use with drills used in drilling and boring subterranean formation or in machining of metal, composites or wood-working.

U.S. Pat. No. 6,260,639 by Yong et al., which is herein incorporated by reference for all that it contains, discloses a cutter element for use in a drill bit, having a substrate comprising a grip portion and an extension and at least a cutting layer affixed to said substrate.

U.S. Pat. No. 6,408,959 by Bertagnolli et al., which is herein incorporated by reference for all that it contains, discloses a cutting element, insert or compact which is provided for use with drills used in the drilling and boring of subterranean formations.

U.S. Pat. No. 6,484,826 by Anderson et al., which is herein incorporated by reference for all that it contains, discloses enhanced inserts formed having a cylindrical grip and a protrusion extending from the grip.

U.S. Pat. No. 5,848,657 by Flood et al, which is herein incorporated by reference for all that it contains, discloses domed polycrystalline diamond cutting element wherein a hemispherical diamond layer is bonded to a tungsten carbide substrate, commonly referred to as a tungsten carbide stud. Broadly, the inventive cutting element includes a metal carbide stud having a proximal end adapted to be placed into a drill bit and a distal end portion. A layer of cutting polycrystalline abrasive material disposed over said distal end portion such that an annulus of metal carbide adjacent and above said drill bit is not covered by said abrasive material layer.

BRIEF SUMMARY OF THE INVENTION

The present invention includes an improved superhard insert comprising a carbide substrate bonded to ceramic layer at an interface. In one aspect of the invention the substrate may comprise a generally frusto-conical end at the interface with a tapered portion leading to a flat portion. A central section of the ceramic layer may comprise a first thickness immediately over the flat portion of the substrate. The peripheral section of the ceramic layer may comprise a second thickness being less than the first thickness covering the tapered portion of the substrate. The flat portion of the interface may serve to substantially diminish the effects of failure initiation points in the insert. The substrate may further comprise a material selected from the group consisting of cemented metal-carbide, tungsten carbide, silicon carbide, and titanium carbide. The ceramic layer may be bonded to the substrate using HPHT technology that incorporates a method using a container comprising a sealant that is used to substantially remove any contaminants before being placed in a HPHT press apparatus. The ceramic layer may further comprise layers of various diamond or cubic boron nitride grain sizes that are infiltrated with a metal binder that are arranged to improve bonding at the interface and help reduce delamination in the ceramic layer.

DETAILED DESCRIPTION OF THE INVENTION AND THE PREFERRED EMBODIMENT

Figure 1:
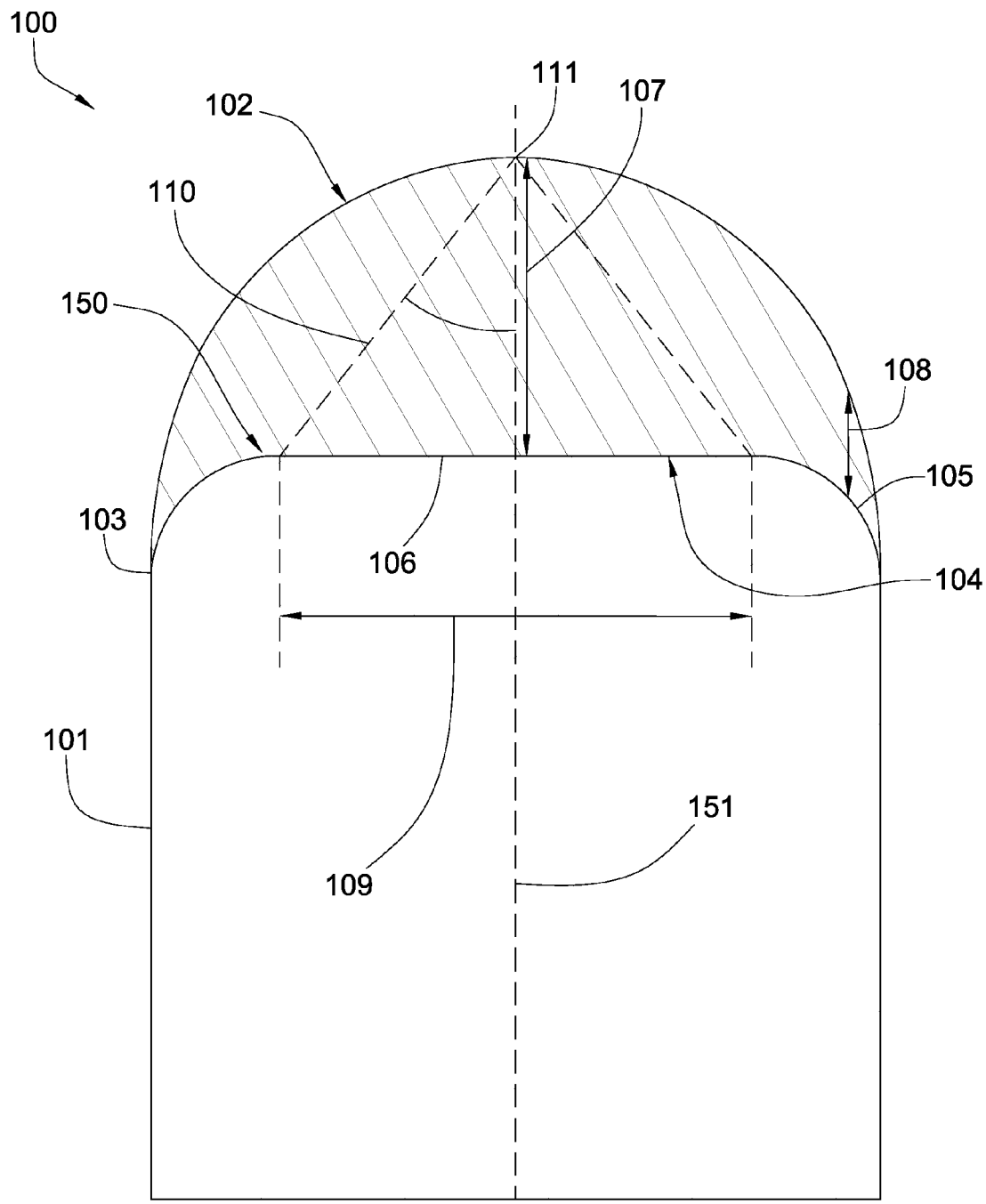
FIG. 1 is a cross sectional diagram of an embodiment of an insert depicting a ceramic layer bonded to a carbide substrate comprising a non-planar interface.

FIG. 1 discloses a superhard insert 100 comprising a carbide substrate 101 bonded to ceramic layer 102 at an interface 103. In one aspect of the invention the carbide substrate 101 may comprise a generally frusto-conical end 104 at the interface 103 with a tapered portion 105 leading to a flat portion 106 comprised of a material selected from the group consisting of cemented metal-carbide, tungsten carbide, silicon carbide, and titanium carbide. In another aspect of the invention the ceramic layer 102 may comprise of cubic boron nitride or diamond with a hardness of at least 4000 HV which is utilized to improve the overall durability of the insert 100. The central section of the ceramic layer 102 may comprise a first thickness 107 between 0.125 and 0.300 inches immediately over the flat portion 106 of the carbide substrate 101 while the peripheral section of the ceramic layer 102 may comprise a second thickness 108 which is less than the first thickness 107 over the tapered portion 105 of the carbide substrate 101. Preferably, the ceramic layer is a monolayer, but in other embodiments, the ceramic layer may comprise a plurality of sublayers.

A significant feature of this invention is the flat portion 106 of the carbide substrate 102 which may effectively redistribute the load stresses across the interface 103 of the carbide substrate 101. The flat portion 106 may comprise a diameter 109 measuring 66% to 133% the first thickness 107 of the ceramic layer 102. In some embodiments, the flat portion 106 may comprise a diameter 109 measuring 75% to 125% the first thickness 107 of the ceramic layer 102. In other embodiments the first thickness is basically equal to the diameter. In some embodiments, a circumference 150 (or a perimeter) of the flat portion 106 may be chosen by placing the circumference 150 so that it intersects generally at an imaginary line 110 which line 110 intersects the central axis 151 of the insert at the apex 111 and forms a generally 45 degrees angle with the central axis 151. In other embodiments, the imaginary line 110 falls within the area of the flat portion 106 generally encompassed by the circumference 150. The flat portion 106 may provide a larger surface area and help to diffuse load stresses on the carbide substrate 101. This may be particularly advantageous in helping to improve the overall durability of the insert 100 especially where the concentration of the load stresses are focused at the apex 111 of the ceramic layer 102 and subsequently transferred to the carbide substrate 101. As a result the effective redistribution of such load stresses may assist to further reduce spalling or delamination of the ceramic layer 102.

It is believed that a load applied to the apex 111 of the ceramic layer 102 will induce a shock wave generally traveling at a 45 degrees in basically all azimuthal directions from the impact of the load. Preferably, the impact occurs proximate the apex 111 and therefore the shock wave may travel basically along the imaginary line 110. Preferably, the shock wave reaches the interface between the ceramic layer and the substrate some wherein in the flat portion so that the shock wave may be loaded to a flat surface rather than on a point of a curved surface. The first thickness' relationship to the diameter of the flat may be critical. If the first thickness is too large than the shock wave may not hit the flat portion. On the other hand if the first thickness is too small, then the shock wave may not have enough room to distribute across the interface 106 focusing too much of the shock wave to localized areas on the flat. If the focused shock wave is too high the bond at the interface may become compromised.

Figure 2:
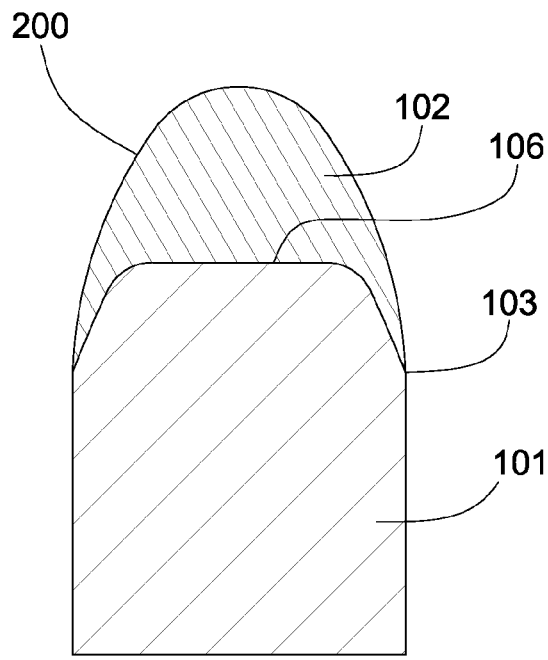
FIG. 2 is a cross sectional diagram of another embodiment depicting a ceramic layer comprising a generally conical tip bonded to a carbide substrate.
Figure 3:
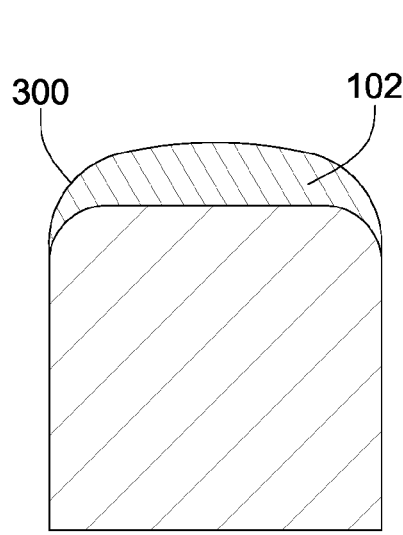
FIG. 3 is a cross sectional diagram of another embodiment depicting a ceramic layer comprising a generally flatten tip bonded to a carbide substrate.
Figure 4:
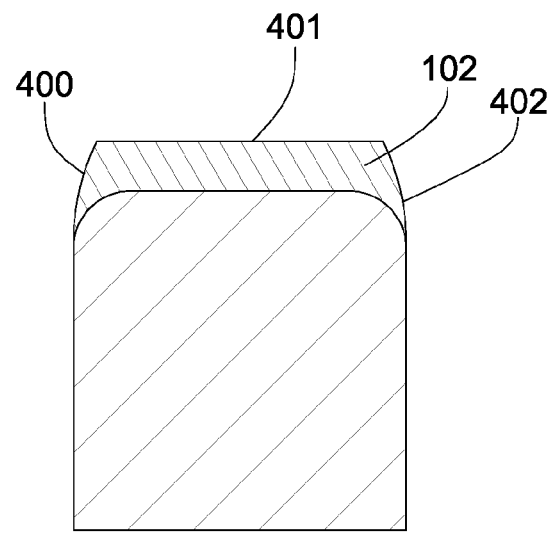
FIG. 4 is a cross sectional diagram of another embodiment depicting a ceramic layer comprising a chamfered geometry
Figure 5:
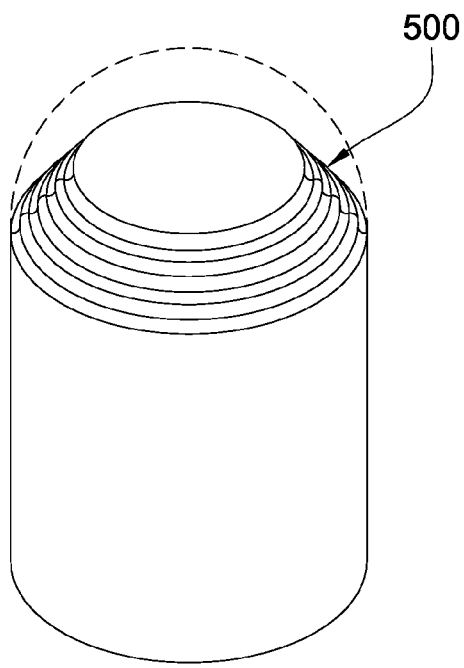
FIG. 5 is a perspective diagram of an embodiment depicting an interface comprising a ribbed annular tapered portion.
Figure 6:
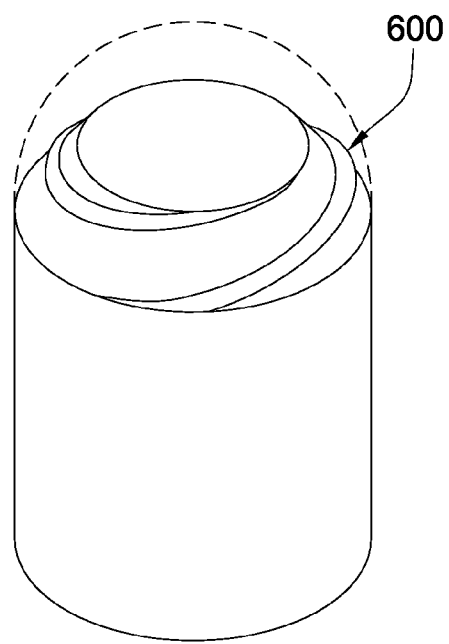
FIG. 6 is a perspective diagram of an embodiment depicting an interface comprising a spiral ribbed tapered portion.
Figure 7:
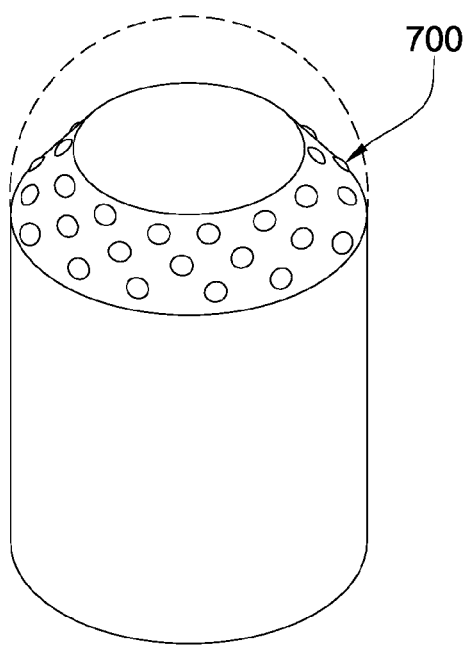
FIG. 7 is a perspective diagram of an embodiment depicting an interface comprising a tapered portion comprising a plurality of protuberances.
Figure 8:
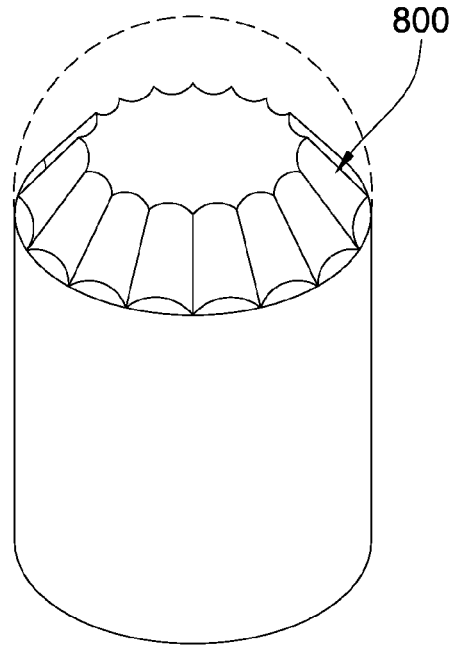
FIG. 8 is a perspective diagram of an embodiment depicting an interface comprising a corrugated tapered portion.

FIG. 2 discloses another embodiment of the current invention depicting the ceramic layer 102 comprising a generally conical geometry 200. The generally conical geometry 200 may comprise a generally thicker ceramic layer 102 directly over the flat portion 106 of the interface 103 between the carbide substrate 101. FIG. 3 discloses another embodiment depicting the ceramic layer 102 comprising a generally slight convex geometry 300 while FIG. 4 discloses an embodiment depicting the ceramic layer 102 comprising a chamfered geometry 400 comprising a generally flat top portion 401 with edges 402 that angles between 90-179 degrees with the flat top.

FIGS. 5-8 depict various configurations of the tapered portion 105 of the interface 103. The tapered portion 105 may comprise a ribbed annular portion 500, a spiral ribbed portion 600, a plurality of protuberances 700 disposed in alternating rows, or a plurality of vertically disposed nodules 800. In some embodiments the various configurations of the tapered portion 105 may assist to provide improved bonding between the interface 103 and help to reduce fragmentation or separation of the carbide substrate 101 from the ceramic layer 102 especially when the insert 100 is subjected to anomalies during operation that may cause detrimental jarring effects.

Figure 9:
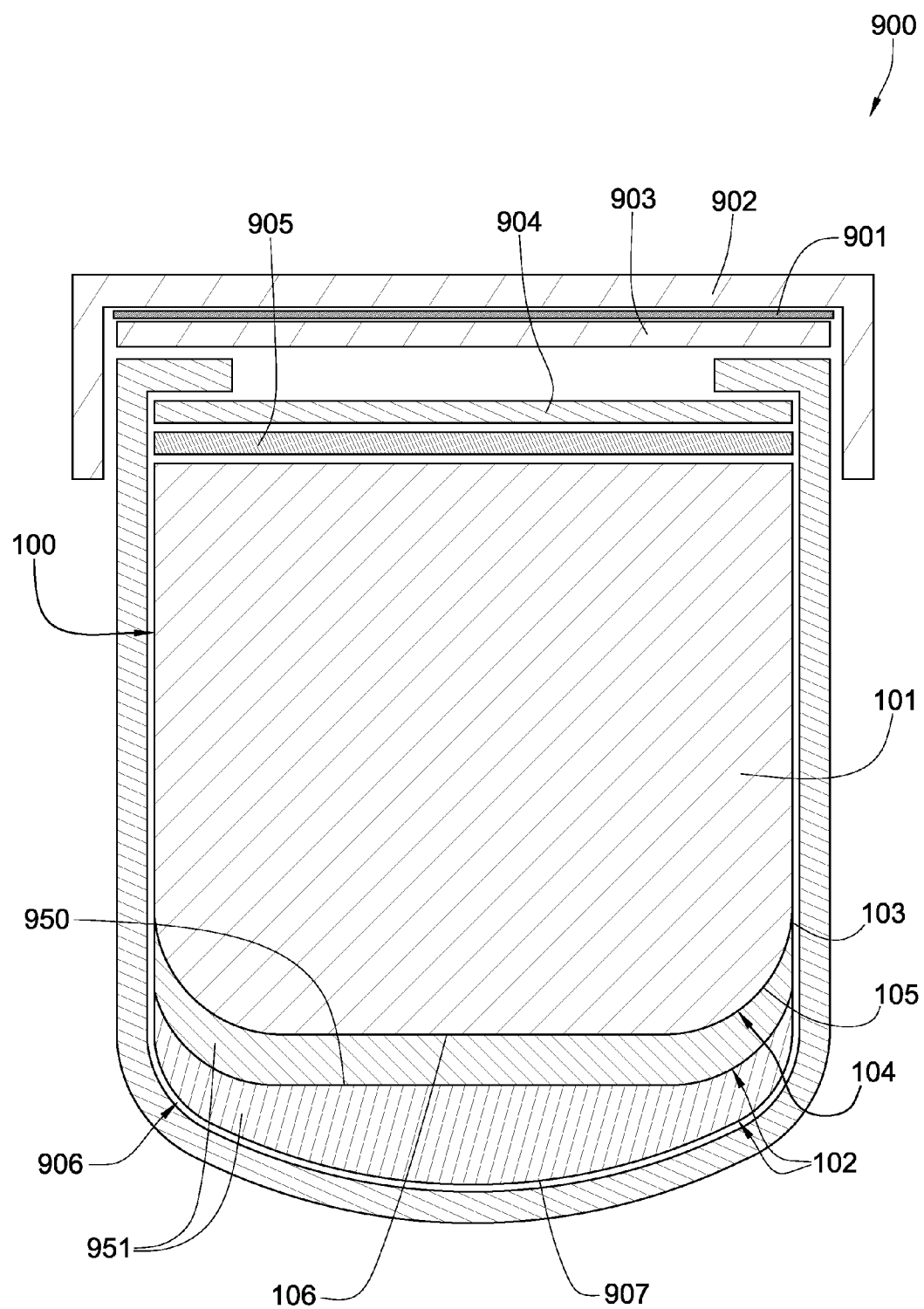
FIG. 9 is a cross sectional diagram of a container of forming an insert depicting the ceramic layer and carbide substrate disposed within a HPHT container.

FIG. 9 discloses another embodiment of the current invention depicting a method of forming the insert 100. U.S. patent Ser. No. 11/469,229 discloses an assembly for HPHT processing which is herein incorporate by reference for all that it contains pertaining to an improved assembly for HPHT processing having a can with an opening and a mixture disposed within the opening. FIG. 9 depicts a container 900 adapted to make the present invention. The container 900 may be comprised of metal or a metal alloy also have a sealant material 901 that may be disposed intermediate a cap 902 and a first lid 903 also comprising a second lid 904 and a sealant barrier 905 which may be used to form the ceramic layer 102 or layers of the insert 100 utilizing HPHT technology. A preformed carbide substrate 101 comprising a generally frusto-conical end 104 at the interface 103 with a tapered portion 105 leading to a flat portion 106 may be infused with a metal binder material selected from the group consisting of cobalt, titanium, tantalum, nickel, aluminum, niobium, iron, gold, silver zinc, ruthenium, rhodium, palladium, chromium, manganese, tungsten, mixtures thereof, alloys thereof, and combinations thereof may be disposed within the container 900 adjacent and above a ceramic mixture 906 which is disposed towards the base of the container 900. The ceramic mixture 906 may comprise cubic boron nitride or diamond that is arranged in sub layers 951 comprised of different diamond grains having smaller or larger sizes ranging between 0.5 and 300 microns. The sub layers 951 may be arranged substantially proportionate to the flat portion 103 of the carbide substrate 101 such that the sub layers 951 are preformed to have substantially flat portion 950. In some embodiments the smaller diamond grains may be disposed towards the upper portion of the ceramic layer 102 and help to provide a generally harder ceramic surface. A harder surface may be advantageous in applications such as drill bits where bit wear on the inserts is critical in providing improved rates of penetration. The larger diamond grains may be disposed closer to the carbide substrate 101 and help to provide better elasticity in the ceramic layer 102. Better elasticity may reduce delamination or spalling of the ceramic layer 102 at the interface 103, especially as the carbide substrate 101 contracts when cooling after the container 900 is later removed from the HPHT press (not shown). The container 900 may comprise a geometry comprising a conical geometry, a hemispherical geometry, rounded geometry, a domed geometry, a chamfered geometry, or combinations thereof that forms the surface 907 of the ceramic layer 102 that conforms to the geometry of the container 900.

A sealant material 901 comprising a material selected from the group consisting of a stop off compound, a solder/braze stop, a mask, a tape, a plate, and sealant flow control, or a combination thereof may be disposed at the opposite end 910. The container 900 and contents may then be heated to a cleansing temperature between 800° C. and 1040° C. for a first period of time between 15 and 60 minutes, which may allow the ceramic mixture 901 to become substantially free of contaminants. The temperature may then be increased to a sealing temperature between 1000° C. and 1200° C. for another 2 and 25 minutes to melt the sealant material 901 and seal the container 900 and the substantially free ceramic mix within it before placing in the HPHT press (not shown).

Figure 10:
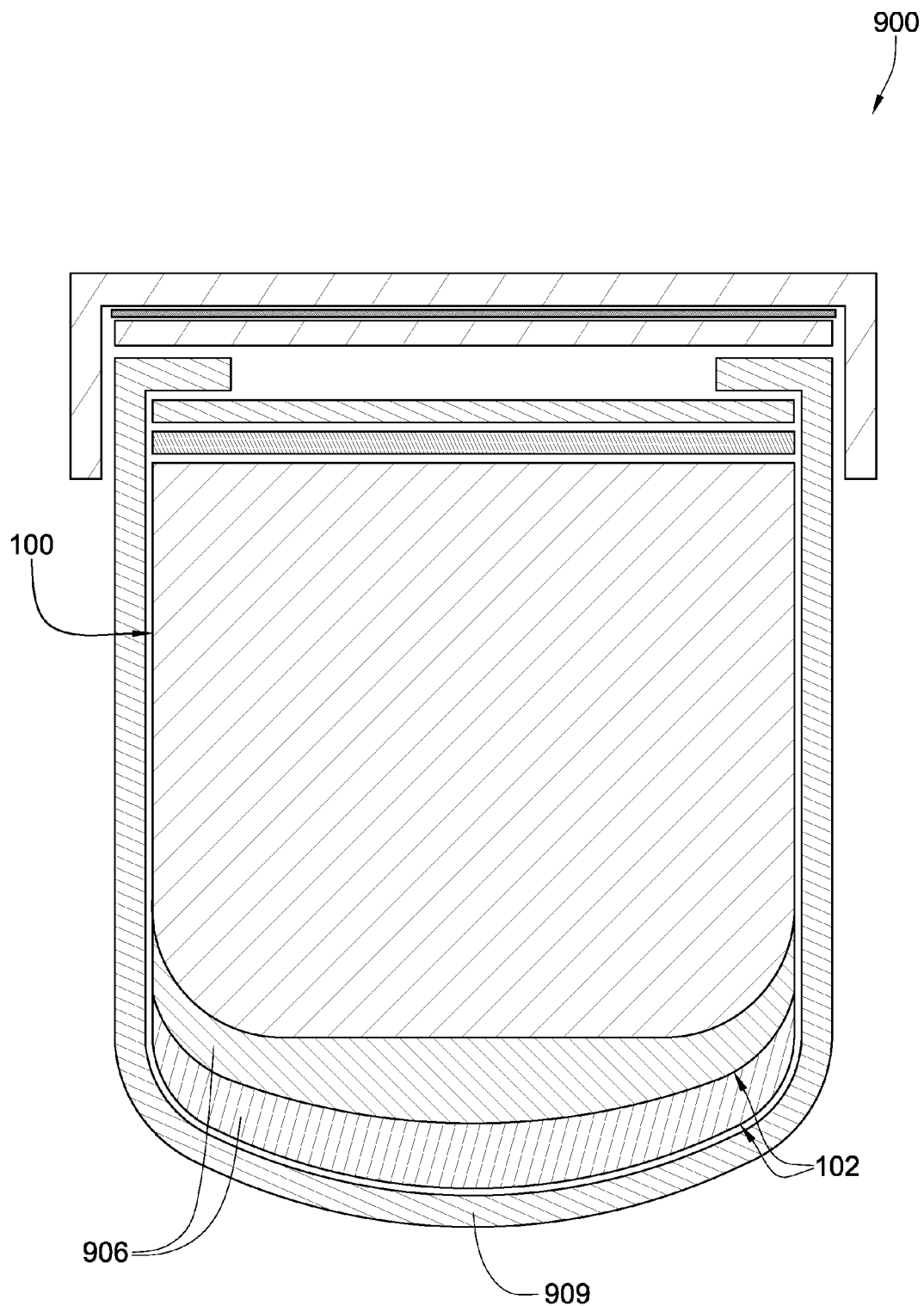
FIG. 10 is a cross sectional diagram of another container of forming an insert depicting the ceramic layer and carbide substrate disposed within a HPHT container.
Figure 11:
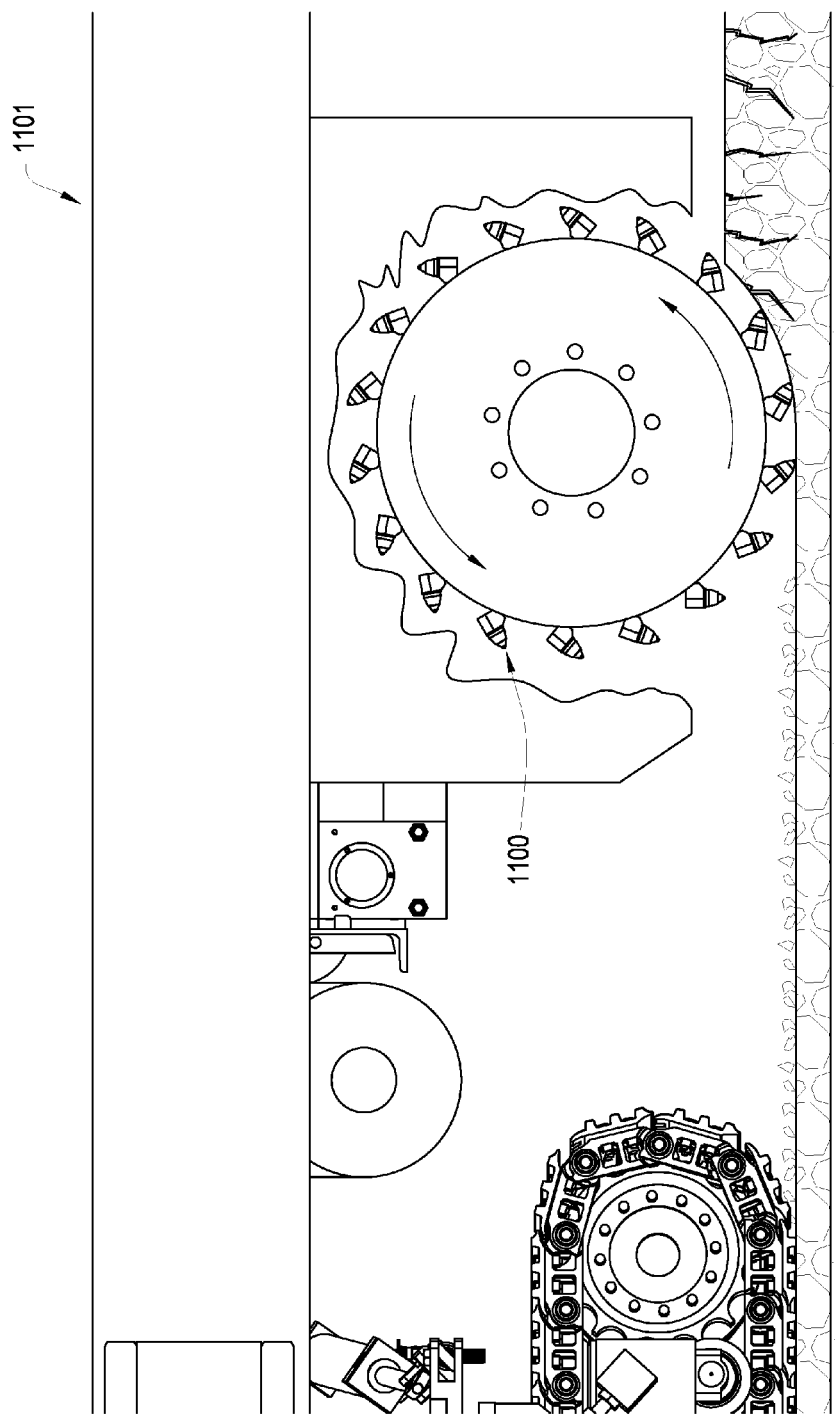
FIG. 11 is a perspective diagram of another embodiment of an insert incorporated in an asphalt milling machine.
Figure 12:
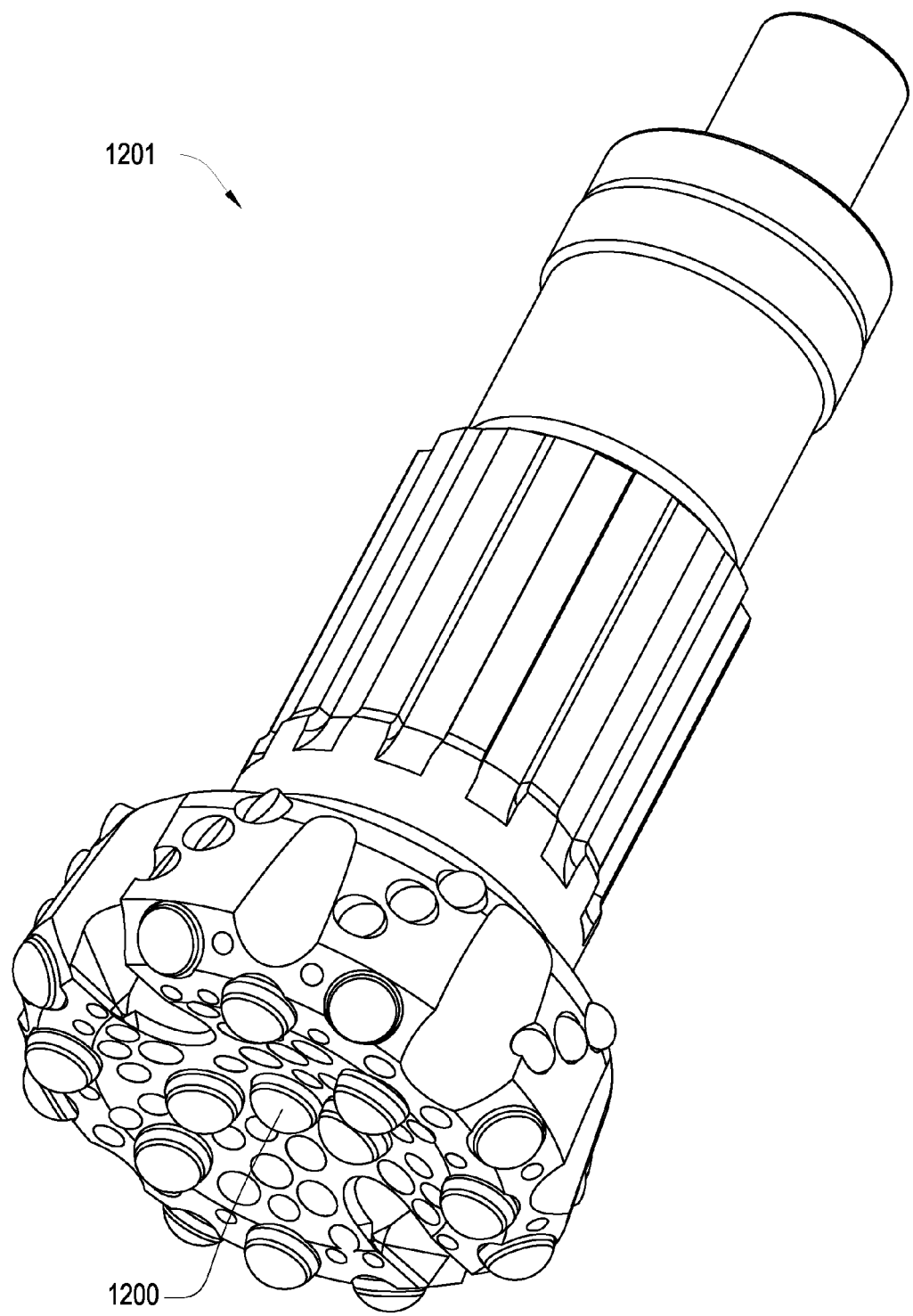
FIG. 12 is a perspective diagram of another embodiment of an insert incorporated in a percussion drill bit.
Figure 13:
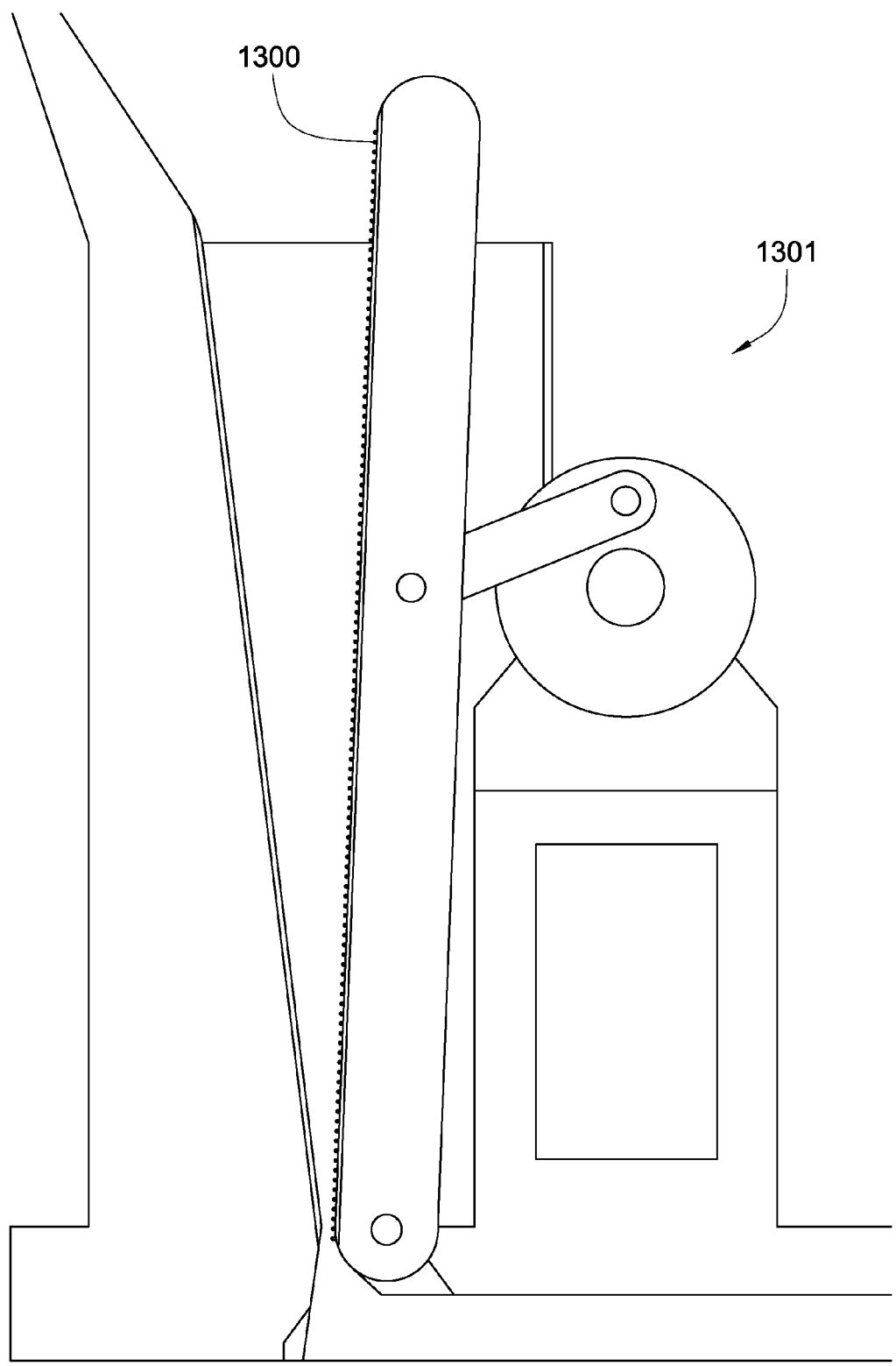
FIG. 13 is a perspective diagram of another embodiment of an insert incorporated in a jaw crusher.
Figure 14:
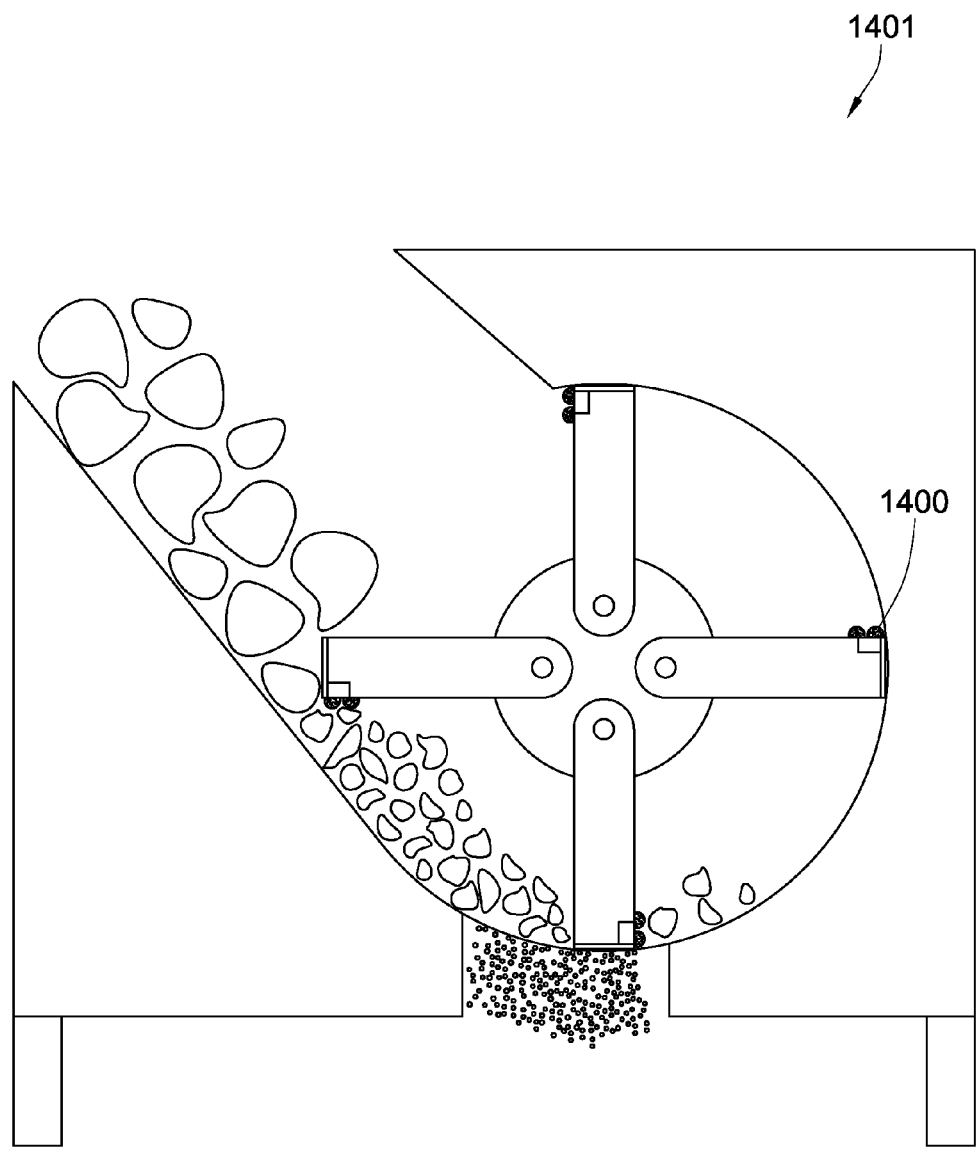
FIG. 14 is a perspective diagram of another embodiment of an insert incorporated in a hammer mill.
Figure 15:
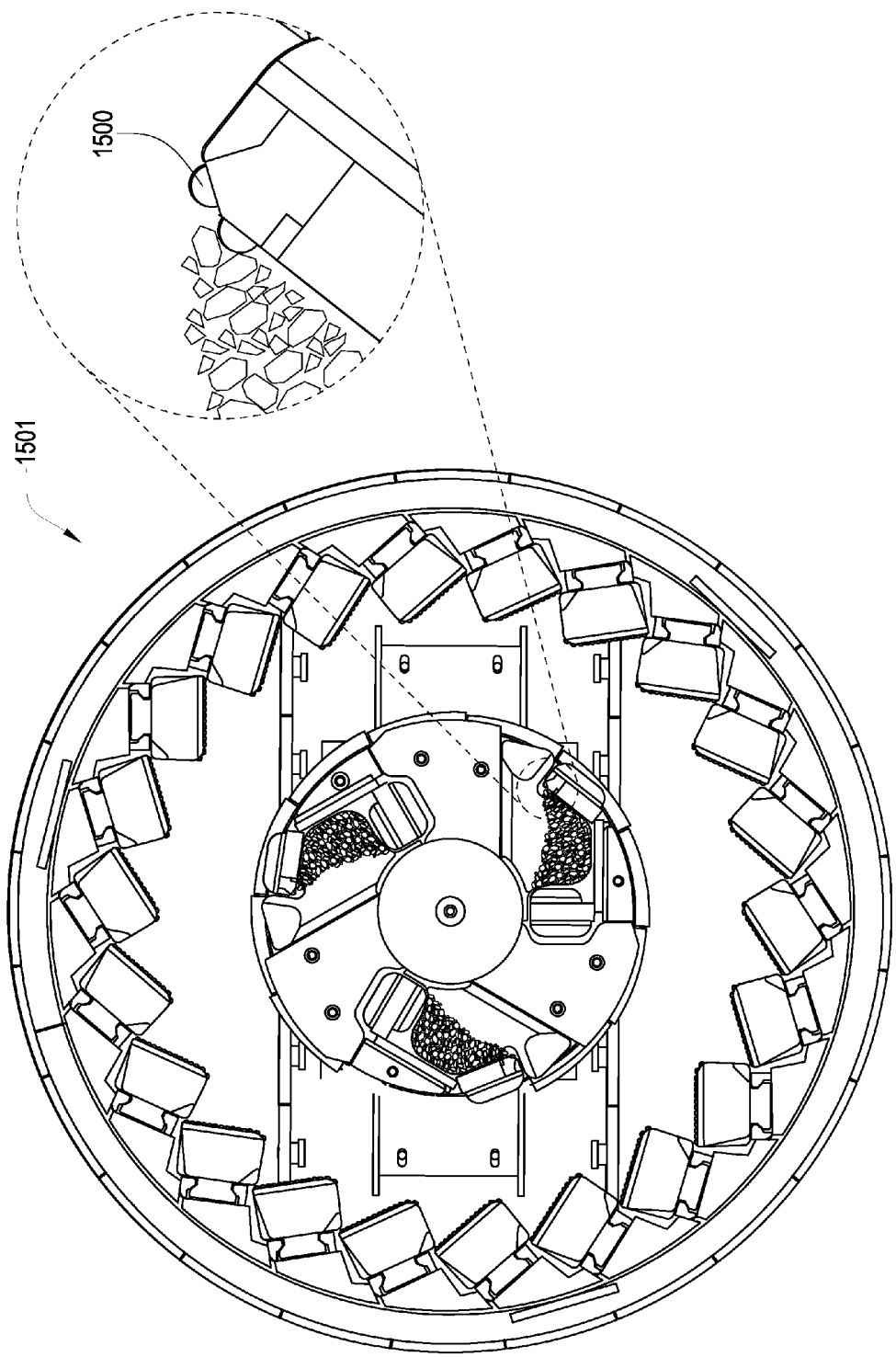
FIG. 15 is a perspective diagram of another embodiment of an insert incorporated in a vertical shaft impactor.

While in the press under the HPHT conditions, the metal binder material may infiltrate from the carbide substrate 101 into the ceramic layer 102 which may further assist to promote bonding at the interface 103. In some embodiments the infiltrated metal binder material may comprise a greater concentration adjacent the interface 103 which gradually diminishes through the remainder of the ceramic layer 102. The infiltrated metal binder material may also assist in providing elasticity in the ceramic layer 102 at the interface 103 and help to further reduce delamination from the carbide substrate 101 during the cooling process after being formed in a HPHT press. FIG. 10 discloses another embodiment of the current invention depicting an alternative method of forming the insert 100 in a container 900 utilizing HPHT technology wherein the ceramic layer 102 may comprise at least one layer of ceramic mixture 906 which may also comprised of diamond having grains of different sizes that conform to the geometry of the base portion 909 of the container 900.

FIGS. 11-14 disclose the current invention depicting the insert within various embodiments as a pick 1100 in an asphalt milling machine 1101, an insert 1200 in a percussion drill bit 1201, an insert 1300 in a jaw crusher 1301, an insert 1400 in a hammer mill 1401, an insert 1500 in an impellor blade in a vertical shaft impactor 1501. In yet other embodiments the insert may also be attached to a mining pick, trenching pick, a drill bit, a shear bit, a roller one bit, a milling machine, a cone crusher, a chisel or combinations thereof.

Whereas the present invention has been described in particular relation to the drawings attached hereto, it should be understood that other and further modifications apart from those shown or suggested herein, may be made within the scope and spirit of the present invention.

What is claimed is:

1. A superhard insert, comprising:
    a carbide substrate bonded to a ceramic mono layer at an interface;
    the ceramic monolayer comprises an apex at the central axis of the insert;
    the substrate comprising a generally frusto-conical end at the interface with a tapered portion leading to a flat portion;
    the ceramic layer comprising diamond or cubic boron nitride and a central section immediately above the flat with a first thickness;
    the ceramic layer also comprising a peripheral section adjacent and bonded to the tapered portion of the substrate, the peripheral section comprising a second thickness which is less than the first thickness; and
    the flat portion comprising a diameter less than the first thickness.

2. The insert of claim 1, wherein the substrate is selected from the group consisting of cemented metal-carbide, tungsten carbide, silicon carbide, and titanium carbide.

3. The insert of claim 1, wherein a metal binder is infiltrated into the ceramic layer and the metal is selected from the group consisting of cobalt, titanium, tantalum, nickel, aluminum, niobium, iron, gold, silver, zinc, ruthenium, rhodium, palladium, chromium, manganese, tungsten, mixtures thereof, alloys thereof, and combinations thereof.

4. The insert of claim 1, wherein the first thickness is between 0.125 to 0.300 inches.

5. The insert of claim 1, wherein the tapered portion comprises ribs, protuberances, or nodules.

6. The insert of claim 1, wherein the ceramic layer comprises a surface with a conical geometry, a hemispherical geometry, rounded geometry, a domed geometry, a chamfered geometry, or combinations thereof.

7. The insert of claim 6, wherein the ceramic layer comprises a sublayer with a substantially flat portion.

8. The insert of claim 1, wherein a metal distribution in the ceramic layer comprises a greater concentration adjacent the interface which gradually diminishes through the remainder of the ceramic layer.

9. The insert of claim 1, wherein the carbide substrate is attached to a pick, mining pick, asphalt pick, trenching pick, drill bit, shear bit, percussion bit, roller cone bit, milling machine, vertical shaft impactor, hammer mill, cone crusher, jaw crusher, chisel, or combinations thereof.

10. The insert of claim 1, wherein the ceramic layer comprises a plurality of sublayers that conform to the geometry of the surface.

11. The insert of claim 1, wherein the flat portion comprises a diameter 75 to 99 percent of the first thickness.

* * * * *